(12) United States Patent  
Toth

(10) Patent No.: US 9,262,841 B2  
(45) Date of Patent: Feb. 16, 2016

(54) FRONT TO BACK COMPOSITING

(71) Applicant: Intel Corporation, Santa Clara, CA (US)

(72) Inventor: Robert M. Toth, Lund (SE)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 14/081,014

(22) Filed: Nov. 15, 2013

(65) Prior Publication Data

US 2015/0138226 A1  May 21, 2015

(51) Int. Cl.
```
G09G 5/39    (2006.01)
G09G 5/00    (2006.01)
G09G 5/02    (2006.01)
G06T 11/00   (2006.01)
G06T 1/20    (2006.01)
G06T 15/00   (2011.01)
G06T 7/40    (2006.01)
G06T 1/00    (2006.01)
G06T 15/50   (2011.01)
```
(52) U.S. Cl.
CPC . *G06T 7/408* (2013.01); *G06T 1/00* (2013.01); *G06T 15/005* (2013.01); *G06T 15/503* (2013.01); *G06T 2210/62* (2013.01)

(58) Field of Classification Search
CPC combination set(s) only.
See application file for complete search history.

(56) References Cited

U.S. PATENT DOCUMENTS

| | | | |
|---|---|---|---|
| 4,745,407 A * | 5/1988 | Costello | 345/550 |
| 5,838,310 A * | 11/1998 | Uya | 345/536 |
| 7,292,256 B2 * | 11/2007 | Lawther et al. | 345/629 |
| 2004/0145599 A1 * | 7/2004 | Taoka et al. | 345/698 |
| 2005/0062750 A1 * | 3/2005 | Hong | 345/562 |
| 2008/0226123 A1 * | 9/2008 | Birtwistle et al. | 382/100 |
| 2010/0005423 A1 * | 1/2010 | Finn et al. | 715/849 |
| 2010/0149201 A1 * | 6/2010 | Guarnieri | 345/556 |

* cited by examiner

*Primary Examiner* — Wesner Sajous
(74) *Attorney, Agent, or Firm* — Trop, Pruner & Hu, P.C.

(57) ABSTRACT

In one embodiment, pixels that cannot change their color due to the alpha blend mode and the color already stored in a render target are detected. For example, if destination alpha blending is used and a target pixel has an alpha value of 1.0, it will not change color regardless of the computed color of subsequently composited objects. Both computing the object colors and accessing the frame buffer can be avoided when such a case is detected. This may save computations and bandwidth in some embodiments.

29 Claims, 5 Drawing Sheets

FRONT TO BACK COMPOSITING

BACKGROUND

This relates generally to compositing and particularly to alpha blending in connection with graphics pipelines.

A graphics pipeline, typically executed by a graphics processing unit, performs a series of operations that result in the display of graphical images on computer displays. Compositing is a process of building the image, typically from back to front, but also possibly from front to back. Back to front compositing builds layer after layer, starting with the rearmost layer (i.e. the one farthest from the viewer). Each layer is composited on top of its predecessors. In front to back compositing, the foreground image plane is generated and then the layers that lie behind that image plane are successively produced.

Two-dimensional casual games and other applications very often perform compositing by drawing the image in a back to front order, always painting closer objects on top of objects further away. Each of the elements is drawn with an alpha value signifying whether a pixel is opaque, transparent, or somewhere between opaque and transparent. This process of repeatedly painting one object over the other results in significant amounts of bandwidth usage. Even simple casual games and other tasks, such as web page rendering, can consume significant amounts of power due to this process of repeatedly painting one object over the other.

In the case to front to back rendering, a rendered target needs to store an alpha channel, indicating how opaque each pixel is. Assuming an object's color is C and alpha value of N (between 0.0 for fully transparent, and 1.0 for fully opaque), and the render target's color is P and alpha value is M, the pixel may be updated as follows:

$$P'=(1-M)*N*C+P.$$

$$M'=M+(1-M)*N$$

The set of rules about how to update the color and alpha value of a pixel is called the blend mode. The blend mode for front to back rendering is generally called destination alpha or DestAlpha blending in OpenGL and Direct3D.

The range of M may also be reversed in some cases, such that an alpha value of zero means fully opaque and a value of one means fully transparent.

BRIEF DESCRIPTION OF THE DRAWINGS

Some embodiments are described with respect to the following figures.

DETAILED DESCRIPTION

Figure 1:
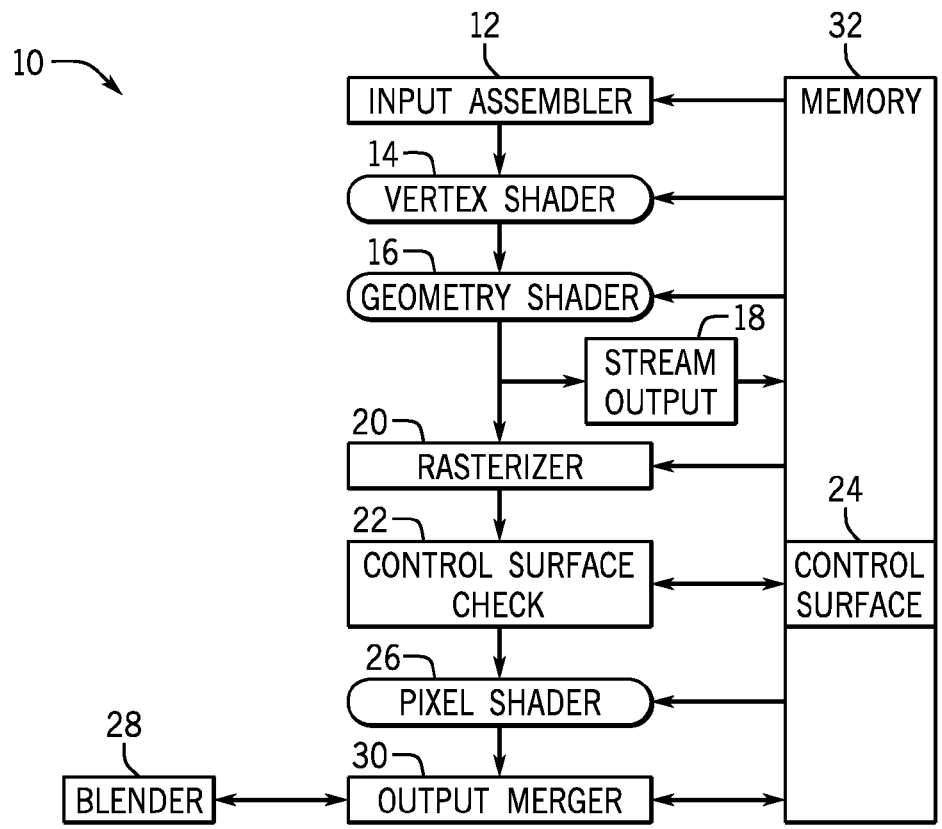
FIG. 1 is a depiction of a graphics pipeline in accordance with one embodiment.

In one embodiment, pixels that cannot change their color due to the alpha blend mode and the color already stored in a render target are detected. For example, if destination alpha blending is used and a target pixel has an alpha value of 1.0, it will not change color regardless of the computed color of subsequently composited objects.

In some embodiments, computing the object colors and accessing the frame buffer may be avoided when such a case is detected. This may save computations and bandwidth in some embodiments. This technique is especially useful on mobile devices and in most applications using some form of two-dimensional compositing.

In some embodiments, the detection algorithm may be hardware implemented but, in other cases, software or firmware may be used. Any combination of hardware, software, and firmware can be used. In some embodiments, using front to back compositing with a destination alpha blend mode, bandwidth usage and computations that will not affect the end result may be automatically eliminated.

A driver may detect when a blend mode can be optimized for the corresponding optimization condition. When the source is the object being drawn and the destination is the already drawn content, and M is the alpha value of the destination, the modes that can be optimized include:

TABLE 1

| Source factor | Destination factor | Condition |
| --- | --- | --- |
| M | 1-M | M = 0 |
| 1-M | M | M = 1 |
| M | 1 | M = 0 |
| 1-M | 1 | M = 1 |
| 0 | M | M = 1 |
| 0 | 1-M | M = 0 |
| 0 | 1 | always |
| (other combinations) | | never |

In each of these cases there is no change in the resulting blending when the condition is met. Therefore, optimization is possible.

There are other state combinations that may be optimized as well, depending on constant blend factors or other similar considerations. Similarly, there may other state variables that may prohibit optimization, such as when updating a stencil buffer. However, by identifying state and destination content combinations that guarantee that the destination will not be altered, bandwidth may be reduced.

Once a blend mode with optimization potential has been identified, bound render targets may be augmented with a control surface with one bit per tile, where a tile, in one embodiment, is a cache line of color data in size. The control surface may initially be set to all zeros. The control surface may be very small, adding only one additional bit per 1024 bits of surface data in one embodiment. The interpretation of the bit in the control surface in one embodiment answers the question: "Can the cache line (or tile) corresponding to this bit possibly be modified?"

A pixel backend performs the actual blending operation. The backend reads the render target data, performs the configured blend operation and stores the modified data. The render target is backed by a cache which may use 1024 bit wide cache lines in one embodiment. If a pixel backend writes an alpha value that fulfills the optimization condition, all the other alpha values in the cache are also checked for that optimization condition. If all the alpha values fulfill the optimization condition, then no data can be modified in the cache line and the bit corresponding to the cache line is set in the control surface to indicate that no bit can be modified.

The control surface may be taken into account during rendering. Particularly, before invoking a pixel shader and before the early depth test, if enabled, a control surface may be checked for the corresponding cache line. If the bit is set, then further processing at that location is skipped.

One reason for using an optimization at a granularity of a cache line is to avoid writing only parts of a cache line, which may generate less benefit, as the cache line must be read as long as any part of it is accessed. As an alternative, the granularity may be chosen to be one bit per 2×2 pixels, which allows slightly more efficient culling of shading work. There may be cases where other granularities are useful, but the two described granularities may be most useful for culling bandwidth usage or shading work respectively.

A control surface is set to all zeros if the corresponding rendering target is used with a different blend mode than was used before and where the previous condition is not a subset of a new condition. The control surface may be set to all zeros if the corresponding render target is cleared. If the render target is cleared to a color that fulfills the optimization condition, the control surface may instead be set to all ones. If a blend mode is used that cannot be optimized, previously allocated control surfaces may be deallocated.

Referring to FIG. 1, a Direct3D 10 pipeline 10 is illustrated in accordance with one embodiment. Pipelines other than the Direct3D 10 programmable pipeline may also be used. This pipeline is designed for generating graphics for real time gaming applications. The input-assembler stage 12 is responsible for supplying data to the pipeline. The vertex shader stage 14 processes the vertices by performing operations such as transformations, skinning and lighting. The geometry shader 16 processes entire primitives. The stream-output stage 18 streams primitive data from the pipeline to the memory 32 on its way to the rasterizer. The data can be streamed out and/or passed to the rasterizer 20. Data streamed to the memory can be recirculated back into the pipeline as input data or read back from a central processing unit (not shown).

The rasterizer stage is responsible for clipping primitives, preparing primitives for the pixel shader and determining how to invoke pixel shaders. Before invoking the pixel shader 26, the rasterizer stage may check the control surface 24 as indicated in block 22 to determine whether an optimization is possible. Then the pixel shader receives the interpolated data for a primitive and generates per pixel data such as color in appropriate cases, as determined by the check at block 22. The pixel backend or output merger stage 30 combines various types of output data such as pixel shader values, depth and stencil information with contents of the rendered target and the depth/stencil buffers to generate the final pipeline result. Blending may be done by the blender 28 communicating with the output merger 30.

Figure 2:
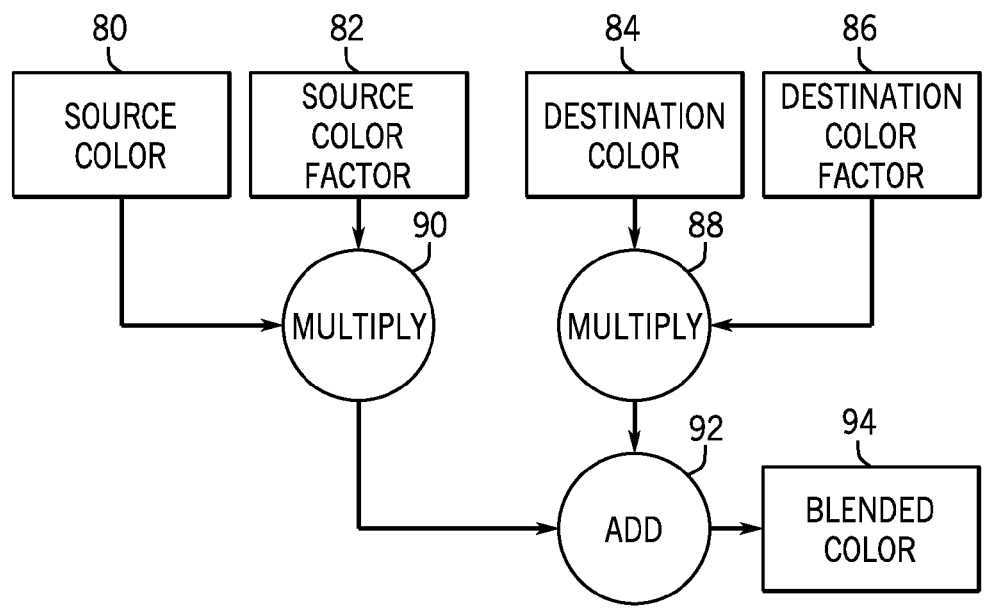
FIG. 2 is a schematic depiction of a color blending operation according to one embodiment.

Referring to FIG. 2, the blended color may be derived from a source color 80, a source color factor 82, a destination color 84 and a destination color factor 86. The derivation of the factors will be described hereinafter. The outputs of multiply stages 90 and 88 are then added at adder 92 to produce the blended color 94.

Figure 3:
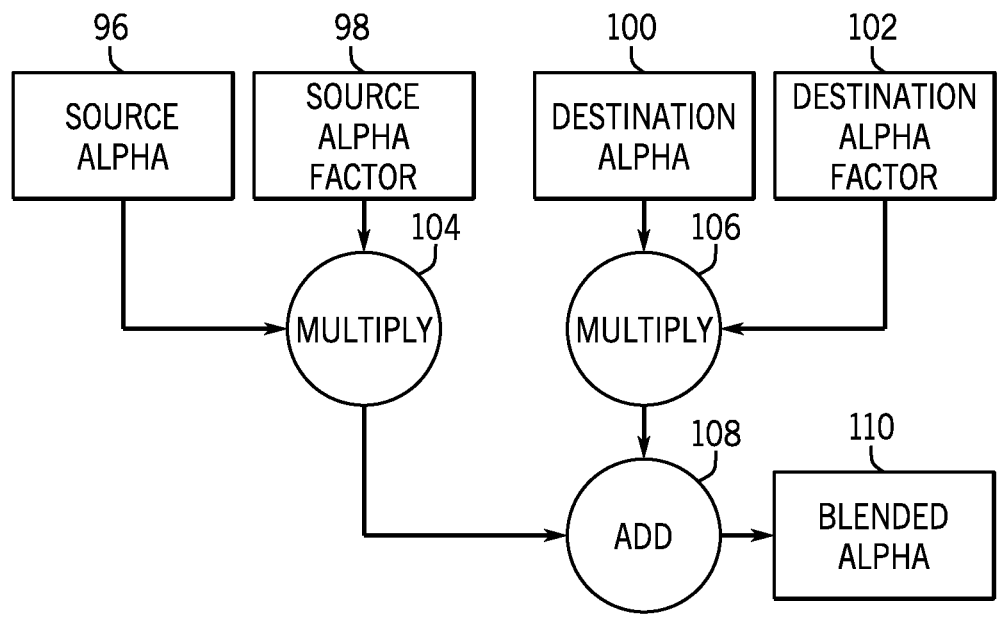
FIG. 3 is a schematic depiction of an alpha blending operation according to one embodiment.

The production of the blended alpha value is illustrated in FIG. 3 according to one embodiment. A source alpha 96, a source alpha factor 98, a destination alpha 100 and a destination alpha factor 102 are multiplied by multipliers 104 and 106 and then added by adder 108 to produce the blended alpha value 110.

Figure 4:
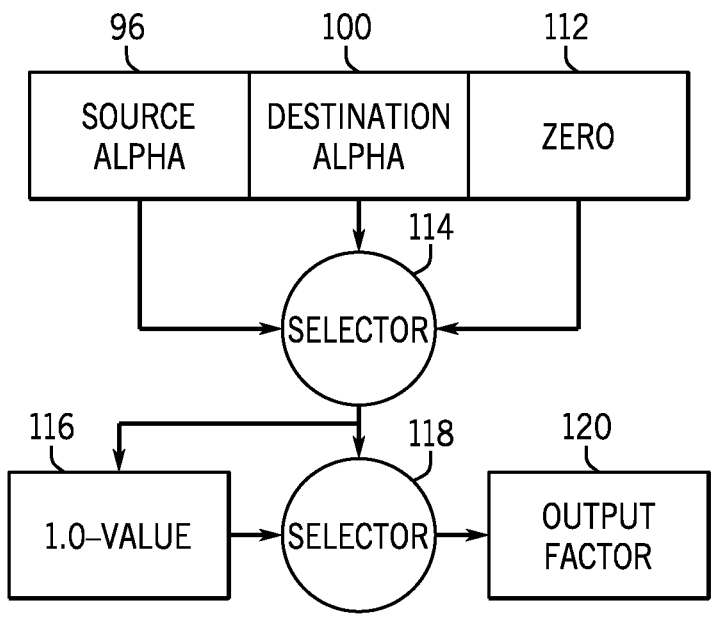
FIG. 4 is a schematic depiction of how the factors in FIGS. 2 and 3 may be determined.

The output factors, such as the factors 82, 86, 98, and 102 indicated collectively as 120 in FIG. 4, may be derived from the source alpha 96, the destination alpha 100 and zero 112 using a selector 114. The selector 114 provides an input to a selector 118 that also receives a 1.0 value to produce the output value 120.

Figure 5:
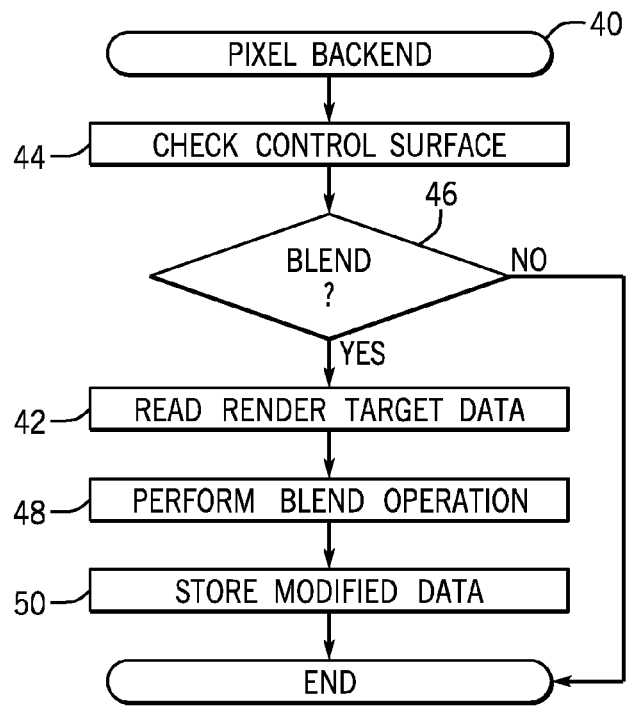
FIG. 5 is a flow chart for a pixel backend according to one embodiment.

Referring to FIG. 5, a pixel backend sequence 40 according to one embodiment may be implemented in hardware, software and/or firmware. In software and firmware embodiments, it may be implemented by computer executed instructions stored in one or more non-transitory computer readable media such as magnetic, optical or semiconductor storage. In some embodiments it may be implemented by a graphics processing unit or an accelerator to give two examples.

The sequence 40 begins by checking the control surface at 44. At diamond 46 it is decided whether or not blending would be appropriate in view of the control surface data, because changes can possibly occur to the blended operation. If it would not be appropriate, because no changes can possibly occur to the blended operation, the flow may end.

Otherwise the render target data is read as indicated in block 42. The render target is read only after the control surface is checked in one embodiment. Bandwidth savings can be achieved by skipping reading of the render target if the control surface indicates that the color will not be altered anyway. Next the blend operation is performed as indicated in block 48. Then the modified data is stored as indicated in block 50.

Figure 6:
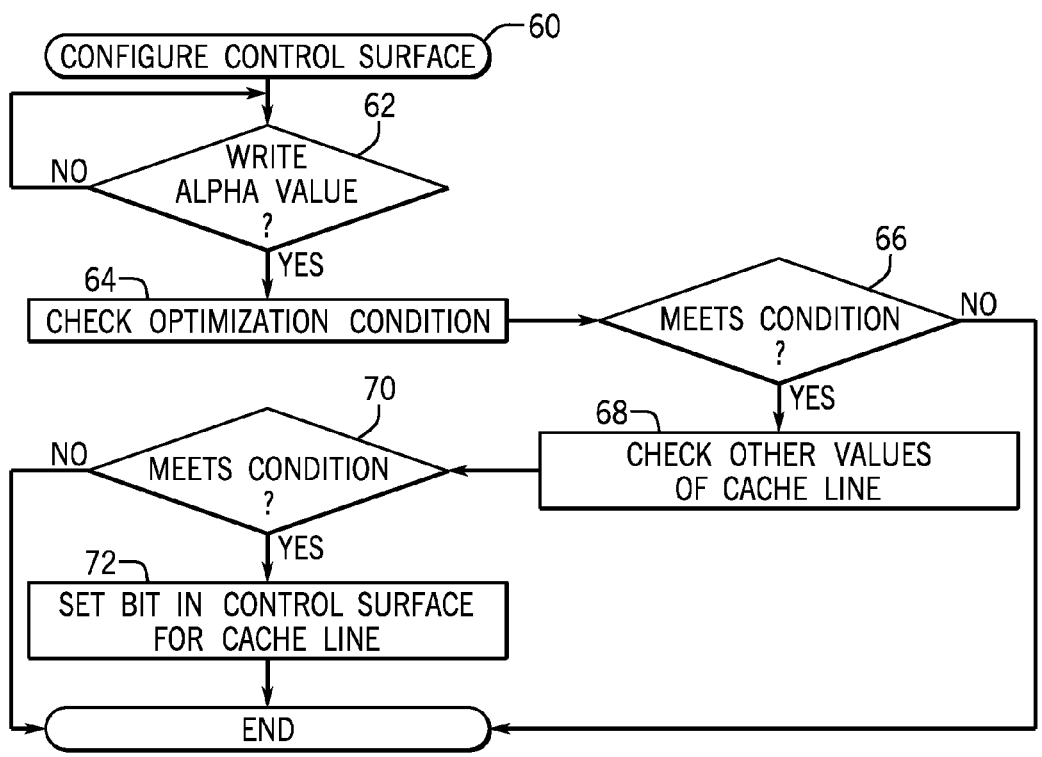
FIG. 6 is a flow chart for a control surface configuration sequence according to one embodiment.

A configure control surface sequence 60, shown in FIG. 6, may be implemented in software, firmware and/or hardware. In software and firmware embodiments, it may implemented by computer executed instructions stored in or more non-transitory computer readable media such as a magnetic, semiconductor or optical storage. It may be implemented in an accelerator or graphics processing unit as two examples.

The sequence 60 begins by determining whether there is a request to write an alpha value at diamond 62. If so, the optimization condition is checked at block 64. If the pixel meets the optimization condition, as determined in diamond 66, then the other values of the cache line are checked at block 68. If they meet the condition, as determined in diamond 70, the bit in the control surface 24 (FIG. 1) in memory 32 is set for that cache line as indicated in block 72.

Figure 7:
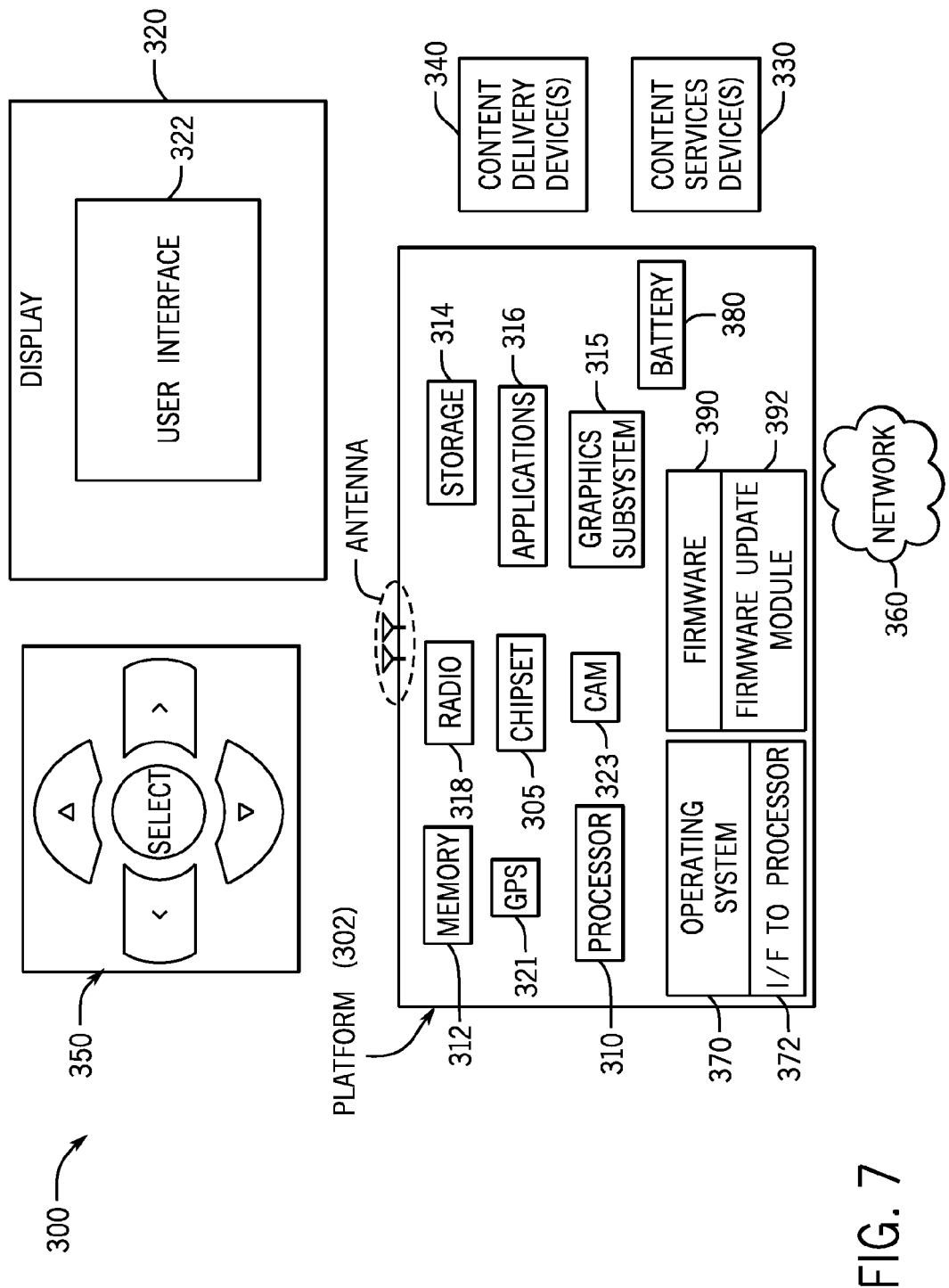
FIG. 7 is a system depiction for one embodiment.

FIG. 7 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth. The processor may implement the sequences of FIGS. 1-6 together with memory 312.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
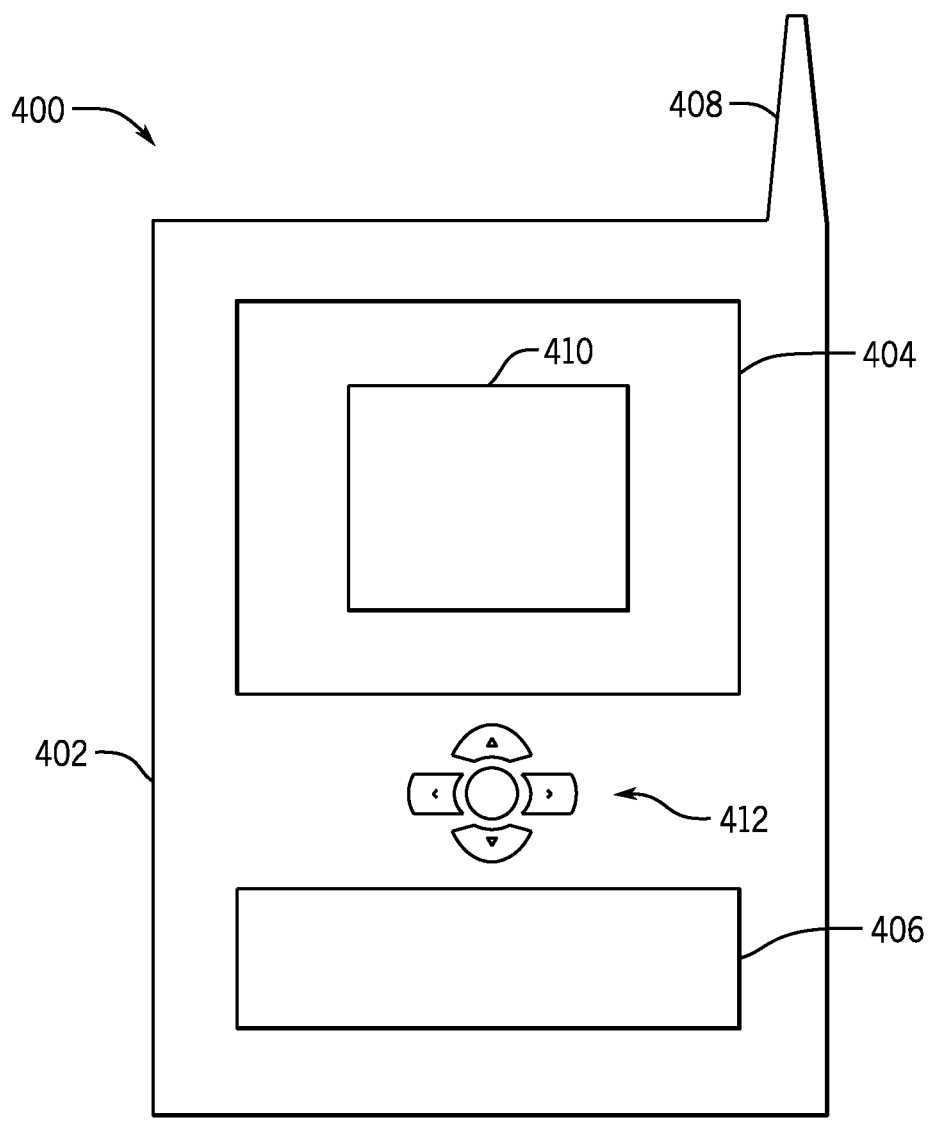
FIG. 8 is a front elevational view of the system shown in FIG. 7 according to one embodiment.

As described above, system 300 may be embodied in varying physical styles or form factors. FIG. 8 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIGS. 1-6 in software and/or firmware embodiments.

As shown in FIG. 8, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising performing front to back compositing, determining whether a pixel in an image being rendered can change its color, and if not, refraining from calculating object colors for said pixel for subsequent objects. The method may also include if not, also refraining from accessing a frame buffer for said pixel for a subsequent object. The method may also include storing an indication that the pixel cannot change its color. The method may also include indicating whether a cache line including said pixel can change color in a subsequent object. The method may also include storing only one bit per cache line to indicate that no pixel in said cache line can change color in a subsequent object. The method may also include determining before performing pixel shading. The method may also include if not, checking whether each pixel in the same cache line can change color. The method may also include refraining from calculating object colors only if all pixels of the cache line cannot change color. The method may also include if not, checking whether each pixel in the same tile can change color. The method may also include refraining from calculating object colors only if all pixels of the tile cannot change color.

Another example embodiment may be at least one non-transitory computer medium storing instructions executed to perform a sequence comprising performing front to back compositing, determining whether a pixel in an image being rendered can change its color, and if not, refraining from accessing a frame buffer for said pixel for subsequent objects. The medium may include said sequence, if not, also refraining from calculating object colors for said pixel for a subsequent object. The medium may include said sequence including storing an indication that the pixel cannot change its color. The medium may include said sequence indicating whether a cache line including said pixel can change color in a subsequent object. The medium may include said sequence including storing only one bit per cache line to indicate that no pixel in said cache line can change color in a subsequent object. The medium may include said sequence including determining before performing pixel shading. The medium may include said sequence including if not, checking whether each pixel in the same cache line can change color. The medium may include said sequence including refraining from calculating object colors only if all pixels of the cache line cannot change color. The medium may include said sequence if not, checking whether each pixel in the same tile can change color. The medium may include said sequence including refraining from calculating object colors only if all pixels of the tile cannot change color.

In another example embodiment may be an apparatus comprising a hardware compositor to perform front to back compositing, determine whether a pixel in an image to be rendered can change color and if not, refrain, from at least one of accessing a frame buffer or calculating colors for said pixel for a subsequent object, and a memory coupled to said compositor. The apparatus may include said compositor to store an indication that the pixel cannot change its color. The apparatus may include said compositor to indicate whether a cache line including said pixel can change color in a subsequent object. The apparatus may include said compositor to store only one bit per cache line to indicate that no pixel in said cache line can change color in a subsequent object. The apparatus may include said compositor to determine before performing pixel shading. The apparatus may include if not, said compositor to check whether each pixel in the same cache line can change color. The apparatus may include an operating system, a battery, firmware and a module to update said firmware.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    while performing front to back compositing in a hardware pixel backend to enable an image to be displayed, determining whether a pixel in an image being rendered can change its color; and
    refraining from calculating object colors for said pixel in the backend in response to a determination that a pixel in an image being rendered cannot change its color.

2. The method of claim 1, including refraining from accessing a frame buffer for said pixel for a subsequent object in response to a determination that a pixel in an image being rendered cannot change its color.

3. The method of claim 1 including storing an indication that the pixel cannot change its color.

4. The method of claim 1 including indicating whether a cache line including said pixel can change color in a subsequent object.

5. The method of claim 4 including storing only one bit per cache line to indicate that no pixel in said cache line can change color in a subsequent object.

6. The method of claim 1 including determining whether a pixel in an image being rendered can change its color before performing pixel shading.

7. The method of claim 1 including, if a pixel in an image being rendered can change its color, checking whether each pixel in the same cache line can change color.

8. The method of claim 7 including refraining from calculating object colors only if all pixels of the cache line cannot change color.

9. The method of claim 1 including, if a pixel in an image being rendered can change its color, checking whether each pixel in the same tile can change color.

10. The method of claim 9 including refraining from calculating object colors only if all pixels of the tile cannot change color.

11. At least one non-transitory computer medium storing instructions executed to perform a sequence for displaying an image comprising:
    performing front to back compositing;
    determining whether a pixel in an image being rendered can change its color; and
    refraining from accessing a frame buffer for said pixel in response to a determination that a pixel in an image being rendered cannot change its color.

12. The sequence of claim 11, including refraining from calculating object colors for said pixel in response to a determination that a pixel in an image being rendered cannot change its color.

13. The sequence of claim 11 including storing an indication that the pixel cannot change its color.

14. The sequence of claim 11 including indicating whether a cache line including said pixel can change color in a subsequent object.

15. The sequence of claim 14 including storing only one bit per cache line to indicate that no pixel in said cache line can change color in a subsequent object.

16. The sequence of claim 11 including determining whether a pixel in an image being rendered can change its color before performing pixel shading.

17. The sequence of claim 12 including, if a pixel in an image being rendered can change its color, checking whether each pixel in the same cache line can change color.

18. The sequence of claim 17 including refraining from calculating object colors only if all pixels of the cache line cannot change color.

19. The sequence of claim 11 including, if a pixel in an image being rendered can change its color, checking whether each pixel in the same tile can change color.

20. The sequence of claim 19 including refraining from calculating object colors only if all pixels of the tile cannot change color.

21. An apparatus for displaying an image comprising:
 a hardware compositor to perform front to back compositing, determine whether a pixel in an image to be rendered can change color and in response to a determination that a pixel in an image being rendered cannot change its color selectively refrain from at least one of access of a frame buffer or calculation of colors for said pixel; and
 a memory coupled to said compositor.

22. The apparatus of claim 21, said compositor to store an indication that the pixel cannot change its color.

23. The apparatus of claim 21, said compositor to indicate whether a cache line including said pixel can change color in a subsequent object.

24. The apparatus of claim 23, said compositor to store only one bit per cache line to indicate that no pixel in said cache line can change color in a subsequent object.

25. The apparatus of claim 21, said compositor to determine whether a pixel in an image being rendered can change its color before performing pixel shading.

26. The apparatus of claim 22, if a pixel in an image being rendered can change its color, said compositor to check whether each pixel in the same cache line can change color.

27. apparatus of claim 21 including an operating system.

28. The apparatus of claim 21 including a battery.

29. The apparatus of claim 21 including firmware and a module to update said firmware.

* * * * *